United States Patent [19]

Schmidt et al.

[11] 4,413,101

[45] Nov. 1, 1983

[54] THERMOPLASTIC POLYURETHANE COMPOSITIONS OF IMPROVED FLAME RETARDANCE

[75] Inventors: Manfred Schmidt, Krefeld, Fed. Rep. of Germany; Robert P. Yeater, Moundsville, W. Va.

[73] Assignee: Mobay Chemical Corporation, Pittsburgh, Pa.

[21] Appl. No.: 318,730

[22] Filed: Nov. 6, 1981

[51] Int. Cl.³ .......................................... C08F 283/00
[52] U.S. Cl. .................................. 525/440; 525/438; 525/439; 525/452
[58] Field of Search ............... 525/439, 440, 452, 538

[56] References Cited

U.S. PATENT DOCUMENTS

| | | | |
|---|---|---|---|
| 3,956,431 | 5/1976 | Honig et al. ........................ | 260/971 |
| 4,017,257 | 4/1977 | Weil .................................... | 525/538 |
| 4,156,663 | 5/1979 | Okanoto ............................. | 525/452 |
| 4,350,799 | 9/1982 | Schmelzer .......................... | 525/439 |

FOREIGN PATENT DOCUMENTS

| | | |
|---|---|---|
| 28345 | 5/1981 | European Pat. Off. . |
| 33826 | 7/1981 | European Pat. Off. . |
| 2944093 | 5/1981 | Fed. Rep. of Germany . |

*Primary Examiner*—Melvyn I. Marquis
*Attorney, Agent, or Firm*—Gene Harsh; Lawrence S. Pope; Aron Preis

[57] ABSTRACT

The present invention is directed to a thermoplastic molding composition comprising thermoplastic polyurethane and a member selected from the group consisting of polyarylphosphonate and polyarylphosphonatocarbonate which composition is characterized by its improved flame retardance.

5 Claims, No Drawings

THERMOPLASTIC POLYURETHANE COMPOSITIONS OF IMPROVED FLAME RETARDANCE

FIELD OF THE INVENTION

The present invention is directed to polymer blends and more particularly to polyblends of thermoplastic polyurethane and certain polyphosphonates.

BACKGROUND OF THE INVENTION

Because of their unique combination of mechanical properties, thermoplastic polyurethanes (hereinafter TPU) have been extensively used in a variety of molding applications. Articles molded therefrom have met the stringent engineering criteria governing applications in the automotive, electrical, mechanical equipment and footwear industries. However, the flammability rating of TPU (UL-94⅛", V-2) limits their utility in certain applications where a greater resistance to flame is required. Halogenated fire retardants, singly or in combination with antimony oxide have been reported to improve the flame retardance of these resins but are known to be unsuitable for some applications where corrosion upon evolution of hydrogen halides attended upon combustion is a determining factor.

Thermoplastic polyphosphonates are characteristically of exceptionally high rating of flame resistance—see, for instance, German DOS No. 29 44 093. Due in part to their level of mechanical properties, however, thermoplastic polyphosphonates are beneficially used in a narrower filed of application.

Polyblends of TPU and certain thermoplastic polyphosphonates purposed at combining their individually useful properties have been reported. It has been, however, the experience of those skilled in the art that certain thermoplastic polyphosphonates desirable as components in a blend with TPU are not compatible therewith and the resulting blends are inhomogeneous, poorly dispersed mixtures which are unsuited for molding applications.

BRIEF DESCRIPTION OF THE INVENTION

It has now surprisingly and unexpectedly been found that certain polyphosphonates, namely, polyarylphosphonates and polyarylphosphonate carbonates are compatible components in blends comprising thermoplastic polyurethanes. The blend thus produced is characteristically of improved flammability rating.

DETAILED DESCRIPTION OF THE INVENTION

I. Thermoplastic Polyurethanes

In the context of the present invention, theremoplastic polyurethanes are those generally prepared from a diisocyanate, a polyester or polyether and a chain extender. These thermoplastic polyurethanes are substantially linear and maintain thermoplastic processing characteristics.

The thermoplastic polyurethanes may be synthesized by methods disclosed in U.S. Pat. No. 3,214,411, incorporated herein by reference. A particularly useful polyester resin which may be used as a starting material for the thermoplastic polyurethanes is produced from adipic acid and a glycol having at least one primary hydroxyl group. The adipic acid is condensed with a suitable glycol or mixture of glycols.

The condensation is stopped when an acid number of from about 0.5 to about 2.0 is reached. The water formed during the reaction is removed simultaneously therewith or subsequently thereto so that the final water content is from about 0.01 to about 0.20%, preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol, up to about 1%, may be used along with the glycols such as, for example trimethylolpropane, glycerin, hexanetriol and the like. The resulting hydroxyl polyester may have a molecular weight of at least about 600, a hydroxyl number of about 25 to about 190 and preferably between about 40 and about 60, an acid number of between about 0.5 and about 2 and a water content of about 0.01 to about 0.2%.

The organic diisocyanate to be used in the preparation of the elastomer is preferably 4,4'-diphenylmethane diisocyanate. It is desired that the 4,4'-diphenyl methane diisocyanate contain less than about 5% of 2,4'-diphenylmethane diisocyanate and less than about 2% of the dimer of diphenylmethane diisocyanate. It is further desired that the acidity calculated as HCl be from about 0.0001 to 0.2%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like.

Any suitable chain extending agent having active hydrogen containing groups reactive with isocyanate groups may be used such as, for example, diols including ethylene glycol, propylene glycol, butylene glycol, 1,4-butanediol, butenediol, bytynediol, xylylene glycols, amylene glycols, 1,4-phenylene-bis-β-hydroxy ethyl ether, 1,3-phenylene-bis-β-hydroxy ethyl ether, bis-(hydroxymethylcyclohexane), hexanediol, thiodiglycol and the like; diamines including ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516; 2,621,166; and 2,729,618, all incorporated herein by reference, may be used. If desirable, a small amount of polyfunctional material may be utilized. This polyfunctional chain extender, however, should not be present in an amount greater than about 1% by weight. Any suitable polyfunctional compound may be used in this application such as, for example, glycerine, trimethylolpropane, hexanetriol, pentaerythritol and the like.

The polyester, the organic diisocyanate and the chain extender may be individually heated preferably to the temperature of from about 60° C. to about 135° and then the polyester and chain extender may be substantially simultaneously mixed with the diisocyanate. Preferably, the chain extender and the polyester, each of which has been previously heated, are first mixed and the resulting mixture is mixed with the heated diisocyanate. This method is preferred for the reason that the extender and the polyester will not react prior to the introduction of diisocyanate and rapid mixing with the diisocyanate is thus facilitated.

The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to 0.050 parts by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516; 2,621,166 and 2,729,618, all incorporated herein by reference.

Other techniques for the production of thermoplastic polyurethanes useful in the context of the present invention are disclosed in the text *Polyurethanes: Chemistry and Technology*, Vol. II, pages 299-452, by J. H. Saunders and K. C. Frisch, Interscience Publishers, New York, 1964, and in the pamphlet *A Processing Handbook for Texin Urethane Elastoplastic Materials*, Mobay Chemical Corporation, Pittsburgh, Pa., both incorporated by reference herein.

Although adipate polyesters are preferred in producing suitable thermoplastic polyurethanes, polyesters which are based on succinic acid, suberic acid, sebacic acid, oxalic acid, methyl adipic acid, glutaric acid, pimelic acid, azelaic acid, phthalic acid, terephthalic acid, isophthalic acid and the like may be used.

Suitable polyesters for the production of thermoplastic polyurethanes also include those based on polymerization products of lactones, for example, caprolactones.

A polyether may be used instead of the polyester in the preparation of the thermoplastic polyurethane, preferably polytetramethylene glycol, having an average molecular weight between about 600 and 2000 and, preferably, about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166; 2,729,618; 3,214,411; 2,778,810; Canadian Pat. Nos. 754,233, 733,577 and 842,325, all incorporated herein by reference, may be used to produce the thermoplastic polyurethanes which are suitable in the context of the present invention.

"Thermoplastic polyurethane" as used herein may alternatively be defined as block polymers that are prepared from a diisocyanate, a polyester or polyether, and a chain extender and that are processable by all the standard techniques of compression or injection molding or by extrusion.

II. Thermoplastic Polyphosphonates

In the context of the present invention, thermoplastic polyaryl phosphonates may be either branched or non-branched resins of a number average molecular weight between 4,000 and 220,000, preferably 11,000 to 200,000, as determined by membrane osmosis using membranes which are permeable to particles having a molecular weight of up to 3,000, characterized in that their molecular structure may be represented by the recurring units of

 (A)

and

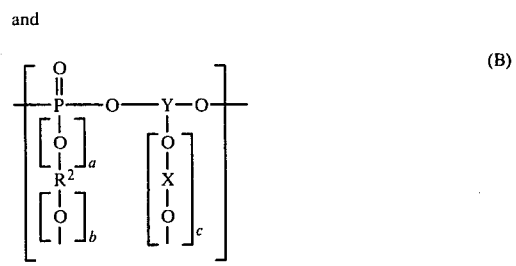 (B)

and in that the terminal members bound to phosphorus atom in structures A and B are any of

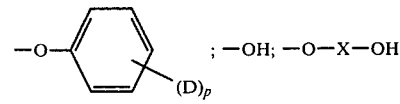

and in that the terminal members bound to the oxygen above are any of

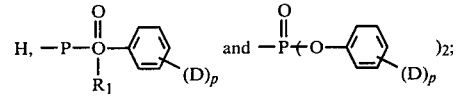

The proportion of B relative to the sum A+B may be from 0.001 to 3 mol percent. In the above representations $R_1$ denotes at least one of $C_6$–$C_{30}$ aryl where the aryl group may be either unsubstituted or substituted by 1 to 5 $C_1$–$C_4$ alkyl groups or by 1 to 5 halogen atoms (fluorine, chlorine or bromine) or by both alkyl groups and halogen atoms;

X represents one or more of the radicals selected from the group consisting of

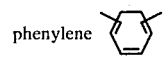
phenylene

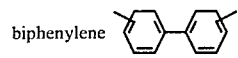
biphenylene

C₁–C₄ alkylene bis-phenylene ⟨⟩—alkylene—⟨⟩

C₅–C₁₂ cycloalkylene bis-phenylene ⟨⟩—cycloalkylene—⟨⟩ thiobis-phenylene ⟨⟩—S—⟨⟩ oxy-bis-phenylene ⟨⟩—O—⟨⟩ sulphonyl-bis-phenylene ⟨⟩—SO₂—⟨⟩ carbonyl-bis-phenylene ⟨⟩—C(=O)—⟨⟩ naphthylene ⟨⟩ wherein any phenyl nucleus may be either unsubstituted or substituted by 1 to 4 C₁–C₄ alkyl groups or by 1 to 4 halogen atoms (fluorine, chloride or bromine) or by the above-mentioned alkyl groups and halogen atoms and the naphthylene nucleus may be either unsubstituted or substituted by 1 to 6 of at least one of the above-mentioned groups or atoms;

Y represents a trifunctional or tetrafunctional residue of a trifunctional mononuclear or trifunctional or tetrafunctional polynuclear phenol from which the phenolic hydroxyl groups have been removed (in the case of the polynuclear phenol), the aromatic nuclei carrying one or two phenolic hydroxy groups are connected by an aliphatic C₁–C₇ hydrocarbon radical or by at least one benzene radical;

Y represents X where c=O, a=1, b=1 and, at the same time, R²=Y'(—O—X—O—)$_c$, or R²=X with y'—Y and c' is either 1 or 2;

a=0 or the number 1;

b=0 or the number 1';

c=0 or one of the numbers 1 or 2, preferably c=1 or 2;

R²=R¹ where a and b are each 0, in which case Y must represent a trifunctional or tetrafunctional radical, as defined above;

R² represents (D)$_p$, where a=1 and b=0, in which case Y must represent a trifunctional or tetrafunctional radical, as defined above;

R² represents X or Y'(—O—X—O)$_c$, where a and b are each the number 1;

D represents the same or different groups and represents a C₁–C₄ alkyl group or halogen (F, Cl or Br) and p=0 or a number of from 1 to 5 preferably p=0.

The above definitions preferably have the following meaning:

R¹ represents phenyl, and

X represents at least one of the radicals phenylene, biphenylene, C₁–C₄ alkylene bis-phenylene, in which case each phenyl nucleus may be substituted by 1 or r methyl groups, cyclohexylene-bis-phenylene, oxy-bis-phenylene, thio-bis-phenylene, sulphonyl-bis-phenylene, particularly C₁–C₄ alkylene-bis-phenylene, in which case each phenyl nucleus may be substituted by one or two methyl groups;

Y represents a trifunctional or tetrafunctional residue of a trifunctional mononuclear or trifunctional or tetrafunctional polynuclear phenol from which the phenolic hydroxyl groups have been removed; in the case of the polynuclear phenol, the aromatic nuclei carrying one or two phenolic hydroxy groups may be connected by aliphatic C₁–C₇ hydrocarbon radicals or by at least one benzene radical;

a=0 or the number 1;

b=0 or the number 1;

c=one of the numbers 1 or 2;

R²=R¹ where a and b are each 0;

R² represents $(D)_p$ where a=1 and b=O;

R² represents X or Y'(—O—X—O—)$_{c'}$ where a and b are each the number 1;

D represents the same or different groups and represents a C₁–C₄ alkyl group and p=O or a number of from 1 to 5, more particularly p=O.

The thermoplastic, branched, aromatic polyarylphosphonates may be prepared by a process whereby diaryl phosphonates and optionally triaryl phosphonates are transesterified, with an aromatic dihydroxy compound and optionally an aromatic trihydroxy or tetrahydroxy compound, in the melt in accordance with a process more fully described in U.S. patent application Ser. Nos. 160,646 and 201,254 both incorporated by reference herein.

In the context of the present invention polyarylphosphonate carbonates have an average molecular weight-number average—of at least 11,000, preferably of 11,000, to 200,000 and most preferably of 20,000 to 80,000 and correspond to the formula E—O—X—O—[M—O—X—O]$_n$E wherein E denotes H or —M—O—Ar where Ar is an aryl radical of 6 to 14 carbon atoms, preferably phenyl which may be substituted by C₁–C₄ alkyl and/or any of F, Cl or Br and M denotes

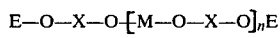

such that the molar ratio between these is between 5:95, and 95:5 preferably between 15:85 and 85:15 and R denotes a C₆–C₃₀ aryl which may be either unsubstituted or substituted by 1 to 5 C₁–C₄ alkyl groups or by 1–5 Fluorine, chloride or bromine atoms or by both alkyl groups and the halogen atoms mentioned and where X is the residue of a dihydroxy compound and denotes a member selected from the group comprising phenylene ⟨⟩, biphenylene ⟨⟩—⟨⟩, C₂–C₄—alkylene bisphenylene ⟨⟩—alkylene—⟨⟩

-continued

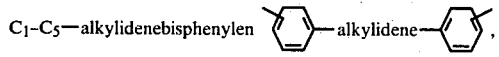

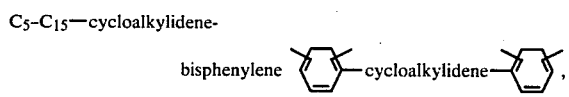

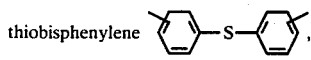

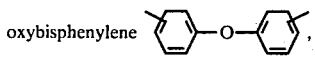

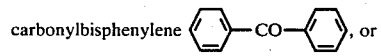

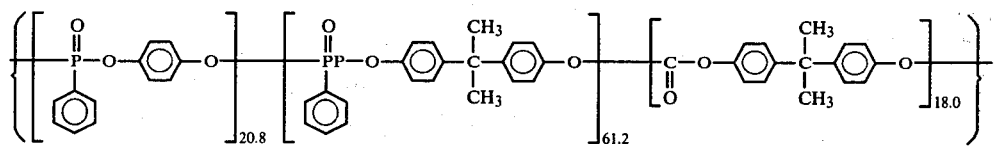

wherein the phenyl nuclei may be unsubstituted or substituted by 1–4 $C_1$–$C_4$ alkyl groups and/or by 1–4 halogen atoms (F, Cl or Br) and the naphthylene nucleus may be either unsubstituted or substituted by 1o6 radicals of either of the alkyl groups and/or the halogen atoms mentioned above, and n denotes the average degree of polymerization corresponding to the above-mentioned molecular weights.
Preferably
R is phenyl
X is at least one of the radicals phenylene, biphenylene, $C_2$–$C_4$-alkylenebisphenylene or $C_1$–$C_5$-alkylidenebisphenylene, it being possible for each phenylene nucleus to be substituted by 1 to 4 methyl groups, or cyclohexylene-bisphenylene, cyclohexylidenebisphenylene, thiobisphenylene or sulphonylbisphenylene, in particular $C_1$–$C_4$-alkylidenebisphenylene in which each phenyl nucleus can be substituted by one or two methyl groups, and Ar=phenyl or p-tolyl.

A more detailed description of the polyarylphosphonato-carbonates suitable in the context of the invention is found in the copending applications U.S. Ser. Nos. 160,644 and 224,077 both incorporated herein by reference.
III. The Blend In the practice of the invention, thermoplastic molding compositions comprising thermoplastic polyurethane and a member selected from the group consisting of polyaryl phosphonates and polyaryl phosphonatecarbonates are blended upon melting of these components such as by co-extrusion, resulting in a homogeneous well dispersed blend which in a preferred embodiment is halogen free. Although any weight ratio between these components is suitable in the practice of the invention a preferred ratio between the thermoplastic polyurethane and said polyphosphonate of from 99:1 to 1:99 more preferably from 80:20 to 20:80.

The preparation of the compositions according to the invention may be carried out in any suitable equipment known in the art of thermally assisted blending of thermoplastic resins. Typically, extrusion blending is among the preferred methods. In preparing the compositions according to the invention care should be taken to thoroughly dry the resins especially the polyurethanes prior to co-extrusion.

Monomeric or polymeric additives or fillers of any type may be added to the compositions. Among these are dyestuffs, pigments, mold release agents, hydrolytic and UV stabilizers and glass particulates or metal powders and fibers of any type.

EXAMPLES

A polyphenyl phosphonatocarbonate having a relative viscosity, measured at 25° C. in 0.5% solutions in $CH_2Cl_2$, of 1.326 and a glass transition temperature of 108° C. (measured by DTA) having a phosphorous content of 9.71% and conforming generally to the structure

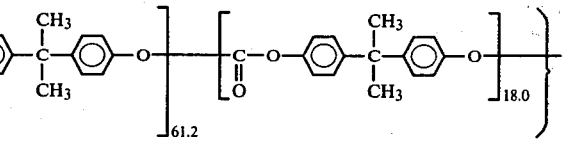

having a weight average molecular weight of 62,000 and a number average molecular weight of 19,400 (determined by gel permeation chromatography and based on bisphenol-A polycarbonate) was prepared in accordance with the procedure outlined in the incorporated by reference U.S. Ser. No. 224,077.

The polyphenylphosphonatocarbonate was extrusion-blended with dried thermoplastic polyurethane in a MPM 1½" extruder under the conditions: Rear zone 490° F., front 325° F., die 465° F. to produce a homogeneous, well dispersed composition containing 80 percent (by weight) polyurethane and 20 percent of the polyphenylphosphonatocarbonate. 0.15 of a lubricating agent (Acrawax C) was added to the blend upon co-extrusion.

Several blends of TPU and polyphosphonates were prepared and their flammability ratings, measured as oxygen index per ASTM D2863, were determined. In the table below the polyphosphonate component is the polyphenylphosphonatocarbonate which detailed properties were described above and the TPU is hexanedioic acid polymer with 1,4-butanediol and 1,1'-methylenebis [4-isocyanatobenzene]. The amounts of the components are shown as percent by weight

| % Polyphosphonate | % TPU | Oxygen Index |
|---|---|---|
| 0 | 100 | 23.1 |
| 5 | 95 | 23.4 |
| 10 | 90 | 24.0 |
| 20 | 80 | 24.2 |

| % Polyphosphonate | % TPU | Oxygen Index |
|---|---|---|
| 40 | 60 | 25.3 |

Although the invention has been described in detail in the foregoing for the purpose of illustration, it is to be understood that such detail is solely for that purpose and that variations can be be made therein by those skilled in the art without departing from the spirit and scope of the invention except as it may be limited by the claims.

What is claimed is:

1. A thermoplastic molding composition comprising thermoplastic polyurethane and a high molecular weight resin selected from the group consisting of polyarylphosphonate and polyarylphosphonatocarbonate wherein said polyarylphosphonate is characterized by the recurring structural units

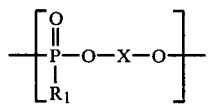

wherein $R_1$ is $C_6$-$C_{30}$ aryl and X is an aromatic residue of a dihydroxy compound and wherein said polyarylphosphonatocarbonate is characterized by the recurring structural units

wherein E denotes H or —M—O—Ar and where Ar is a $C_6$-$C_{14}$ aryl radical and M denotes

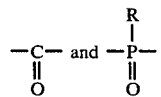

having a molar ratio of between 5:95 to 95:5 and R denotes a $C_6$ to $C_{30}$ aryl and $X_1$ denotes a residue of a dihydroxy compound.

2. The composition of claim 1 wherein said $R_1$ is phenyl.

3. The composition of claim 1 wherein said R is a phenyl.

4. A method for the preparation of a homogeneous, well dispersed thermoplastic molding composition comprising coextruding dry thermoplastic polyurethane and a high molecular weight resin selected from the group consisting of polyarylphosphonate and polyarylphosphonatocarbonate wherein said polyarylphosphonate is characterized by the recurring structural units

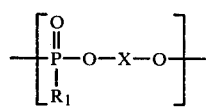

wherein $R_1$ is $C_6$-$C_{30}$ aryl and X is an aromatic residue of a dihydroxy compound and wherein said polyarylphosphonatocarbonate is characterized by the recurring structural units

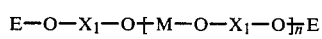

wherein E denotes H or —M—O—Ar and where Ar is a $C_6$-$C_{14}$ aryl radical and M denotes

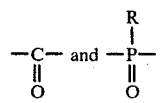

having a molar ratio of between 5:95 to 95:5 and R denotes a $C_6$ to $C_{30}$ aryl and $X_1$ denotes a residue of a dihydroxy compound.

5. The composition of claim 1 wherein said thermoplastic polyurethane is present in an amount of from about 60 to about 80 percent and said high molecular weight resin is present in an amount of from about 40 to about 20 percent, said percents being relative to the weight of said composition.

* * * * *